US007629760B2

(12) United States Patent
Isobe et al.

(10) Patent No.: US 7,629,760 B2
(45) Date of Patent: Dec. 8, 2009

(54) CONTROLLING DEVICE FOR RANGE SWITCH MECHANISM

(75) Inventors: Eiji Isobe, Kariya (JP); Shigeru Kamio, Nagoya (JP); Takeshi Miyagawa, Toyokawa (JP); Hideto Watanabe, Toyota (JP); Yoshimitsu Yokouchi, Toyota (JP); Koki Ueno, Toyota (JP); Takahiko Tsutsumi, Toyota (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 372 days.

(21) Appl. No.: 11/822,933

(22) Filed: Jul. 11, 2007

(65) Prior Publication Data

US 2008/0024081 A1 Jan. 31, 2008

(30) Foreign Application Priority Data

Jul. 31, 2006 (JP) .............................. 2006-208563

(51) Int. Cl.
*G05B 5/00* (2006.01)
(52) U.S. Cl. .................. 318/446; 318/445; 318/449; 318/473; 318/450; 307/650; 307/651; 307/117; 73/570; 361/161; 74/469
(58) Field of Classification Search .................. 318/445, 318/446, 449, 473, 450; 307/117, 650, 651; 73/570; 361/161
See application file for complete search history.

(56) References Cited

U.S. PATENT DOCUMENTS 5,873,802 A * 2/1999 Tabata et al. ................... 477/96

| | | | | |
|---|---|---|---|---|
| 6,059,688 A * | 5/2000 | Nozaki et al. | ................. | 477/97 |
| 6,145,398 A * | 11/2000 | Bansbach et al. | ............. | 74/335 |
| 6,149,546 A * | 11/2000 | Tabata et al. | ................ | 477/125 |
| 6,336,373 B1 * | 1/2002 | Murai et al. | ............. | 74/473.23 |
| 6,637,281 B2 * | 10/2003 | Yamamoto | ................... | 74/335 |
| 7,174,801 B2 * | 2/2007 | Ogasawara et al. | ........ | 74/473.3 |
| 2001/0006129 A1 * | 7/2001 | Lee | ............................ | 180/370 |
| 2002/0162699 A1 * | 11/2002 | Shiomi et al. | ............... | 180/315 |
| 2005/0082096 A1 * | 4/2005 | Oono | ....................... | 180/65.2 |
| 2006/0033464 A1 | 2/2006 | Nakai et al. | | |
| 2006/0197489 A1 | 9/2006 | Nakai et al. | | |

FOREIGN PATENT DOCUMENTS

JP     2002-286128     10/2002

* cited by examiner

*Primary Examiner*—Rita Leykin
(74) *Attorney, Agent, or Firm*—Nixon & Vanderhye, PC

(57) ABSTRACT

A controlling device includes a range switch mechanism, range switch operating means, operation frequency monitoring means, and heat generation limit controlling means. The range switch mechanism is adapted to change a shift range using a motor. Through the range switch operating means, an occupant inputs a required shift range. The motor is controlled in accordance with the required shift range such that the shift range is changed into the required shift range. The operation frequency monitoring means monitors an operation frequency of the range switch operating means. The heat generation limit controlling means switches a control of the motor to a heat generation limit control when the operation frequency of the range switch operating means exceeds a predetermined frequency.

16 Claims, 9 Drawing Sheets

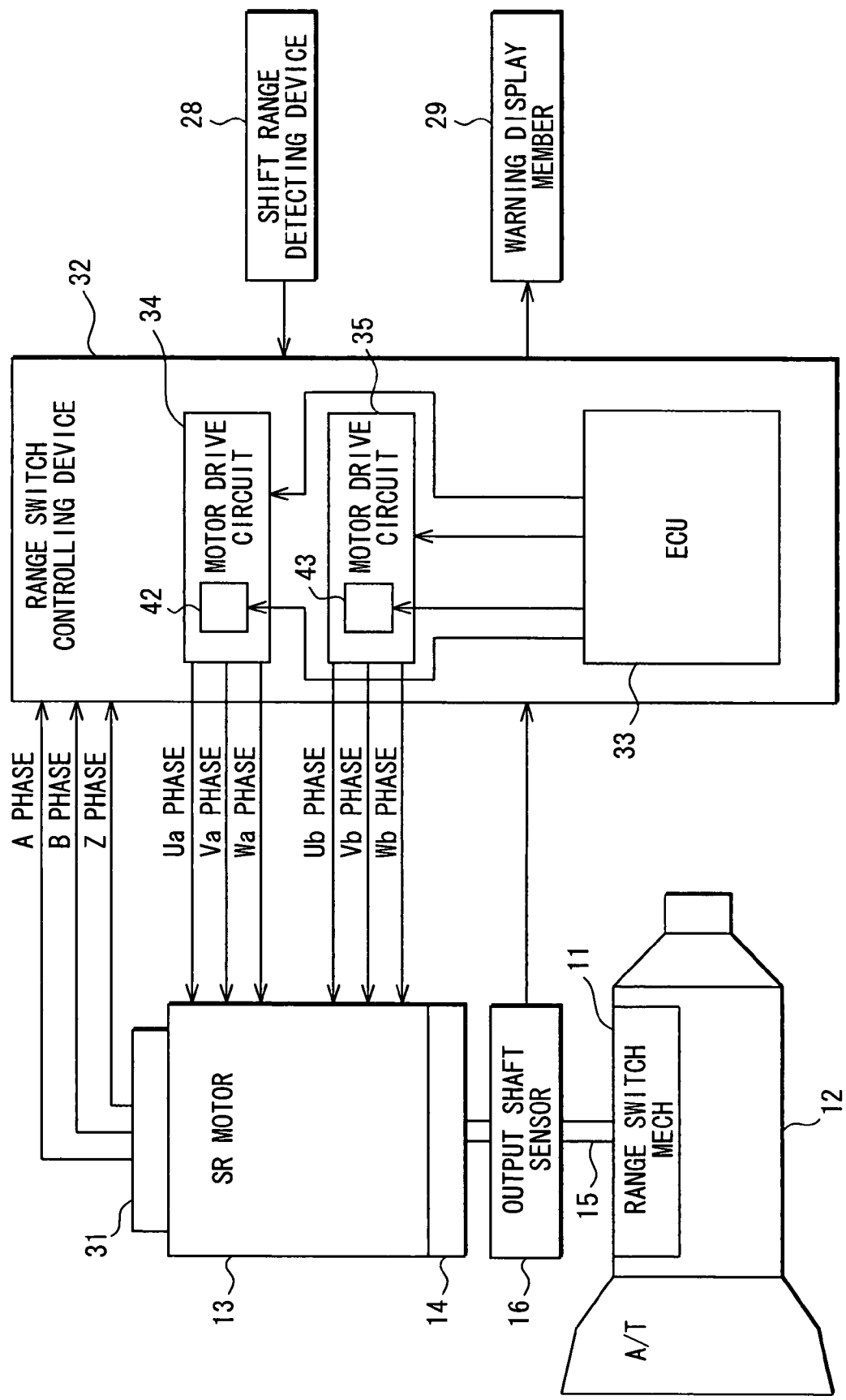

CONTROLLING DEVICE FOR RANGE SWITCH MECHANISM

CROSS REFERENCE TO RELATED APPLICATION

This application is based on and incorporates herein by reference Japanese Patent Application No. 2006-208563 filed on Jul. 31, 2006.

BACKGROUND OF THE INVENTION

1. Field of the Invention

The present invention relates to a controlling device for controlling a range switch mechanism to change (switch) a shift range of the range switch mechanism by driving and controlling a motor in accordance with a range switch operation by an occupant.

2. Description of Related Art

Recently, as JP-A-2002-286128 and JP-A-2004-23932 disclose, a vehicle has become electronically controlled, and a system has been developed for detecting with a switch a range switch operation (shift lever manipulation) by an occupant, and for driving and controlling a motor based on the detection signal to change the shift range of a range switch mechanism into a required shift range required by the occupant.

As shown in FIG. 5, every time the range switch operation is performed to change the shift range into the required shift range, the motor is started accordingly and is stopped after the shift range of the range switch mechanism has been changed into the required shift range, and the start and stop are is repeated. While the motor is energized, a coil of the motor and a drive circuit generate heat. Therefore, while the motor is stopped, the heat generated by the energization of the motor is released such that a temperature of the motor is lowered (e.g., a motor stop period, where the motor is stopped, serves as a motor cooling period).

In general, while the vehicle travels, the occupant may not frequently change the shift range from a traveling range (e.g., D range) into another. However, when the vehicle is stopped, the occupant may frequently perform a needless range switch operation for a pastime (e.g., for pleasure), because the shift range is changeable into any shift range while the vehicle is stopped. In a case, where the range switch operation is frequently repeated, the motor stop period (motor cooling period) may be shortened or become zero for each of the range switch operation. As a result, an increase of the temperature due to the heat generation by the coil of the motor and the drive circuit may not be limited, and thereby the coil of the motor and the drive circuit may have excessively high temperature. Thus, this may decrease duration of life of the system and may cause a malfunction of the system.

SUMMARY OF THE INVENTION

The present invention is made in view of the above disadvantages. Thus, it is an objective of the present invention to address at least one of the above disadvantages.

To achieve the objective of the present invention, there is provided a controlling device, which includes a range switch mechanism, range switch operating means, operation frequency monitoring means, and heat generation limit controlling means. The range switch mechanism is adapted to change a shift range using a motor as a drive source. Through the range switch operating means, an occupant inputs a required shift range required by the occupant. The motor is controlled in accordance with the required shift range inputted through the range switch operating means such that the shift range of the range switch mechanism is changed into the required shift range. The operation frequency monitoring means monitors an operation frequency of the range switch operating means. The heat generation limit controlling means switches a control of the motor to a heat generation limit control, in which a heat generation rate is less than that of a normal control, when the operation frequency of the range switch operating means exceeds a predetermined frequency.

To achieve the objective of the present invention, there is also provided a controlling device for controlling a motor to perform a range switch operation for switching a shift range of a range switch mechanism of a vehicle, the controlling device including an operation frequency detector and a heat generation limit controller. The operation frequency detector is adapted to detect an operation frequency of performing the range switch operation. The heat generation limit controller is adapted to switch a control of the motor into a heat generation limit control, in which a heat generation rate is less than a predetermined value, when the operation frequency of the range switch operation exceeds a predetermined frequency.

BRIEF DESCRIPTION OF THE DRAWINGS

The invention, together with additional objectives, features and advantages thereof, will be best understood from the following description, the appended claims and the accompanying drawings in which:

FIG. 10 is a schematic diagram showing a general configuration of a control system of a range switch device a the third embodiment of the present invention;

DETAILED DESCRIPTION OF PREFERRED EMBODIMENTS

First to seventh embodiments that embody the best modes for carrying out the present invention are described.

First Embodiment

The first embodiment of the present invention is described referring to FIGS. 1 to 7.

Figure 1:
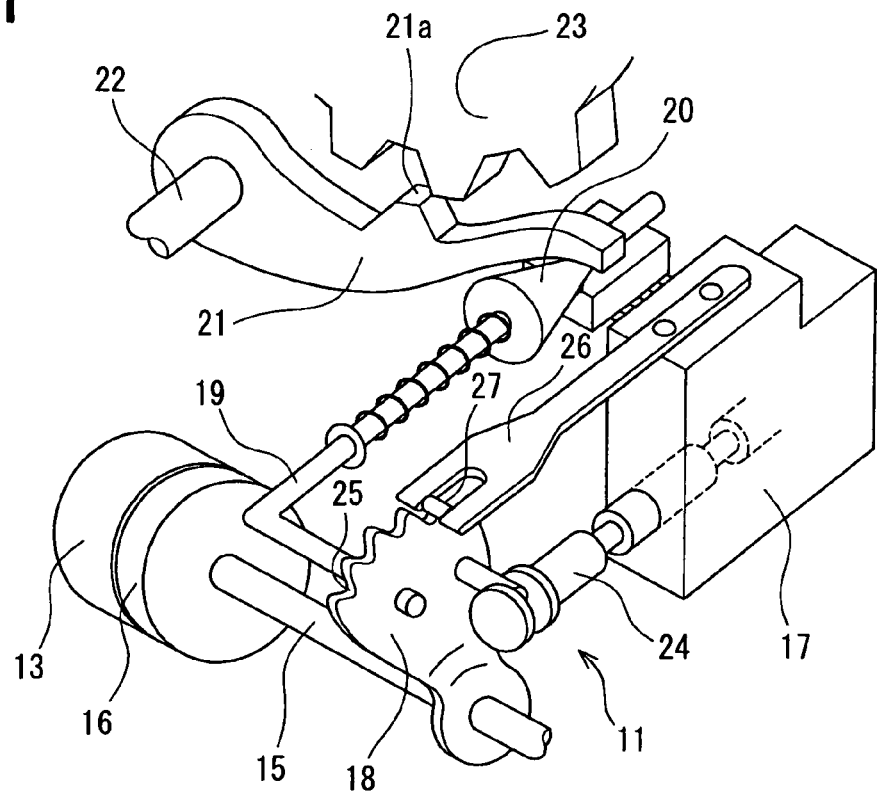
FIG. 1 is a perspective view showing a range switch device of a first embodiment of the present invention.
Figure 2:
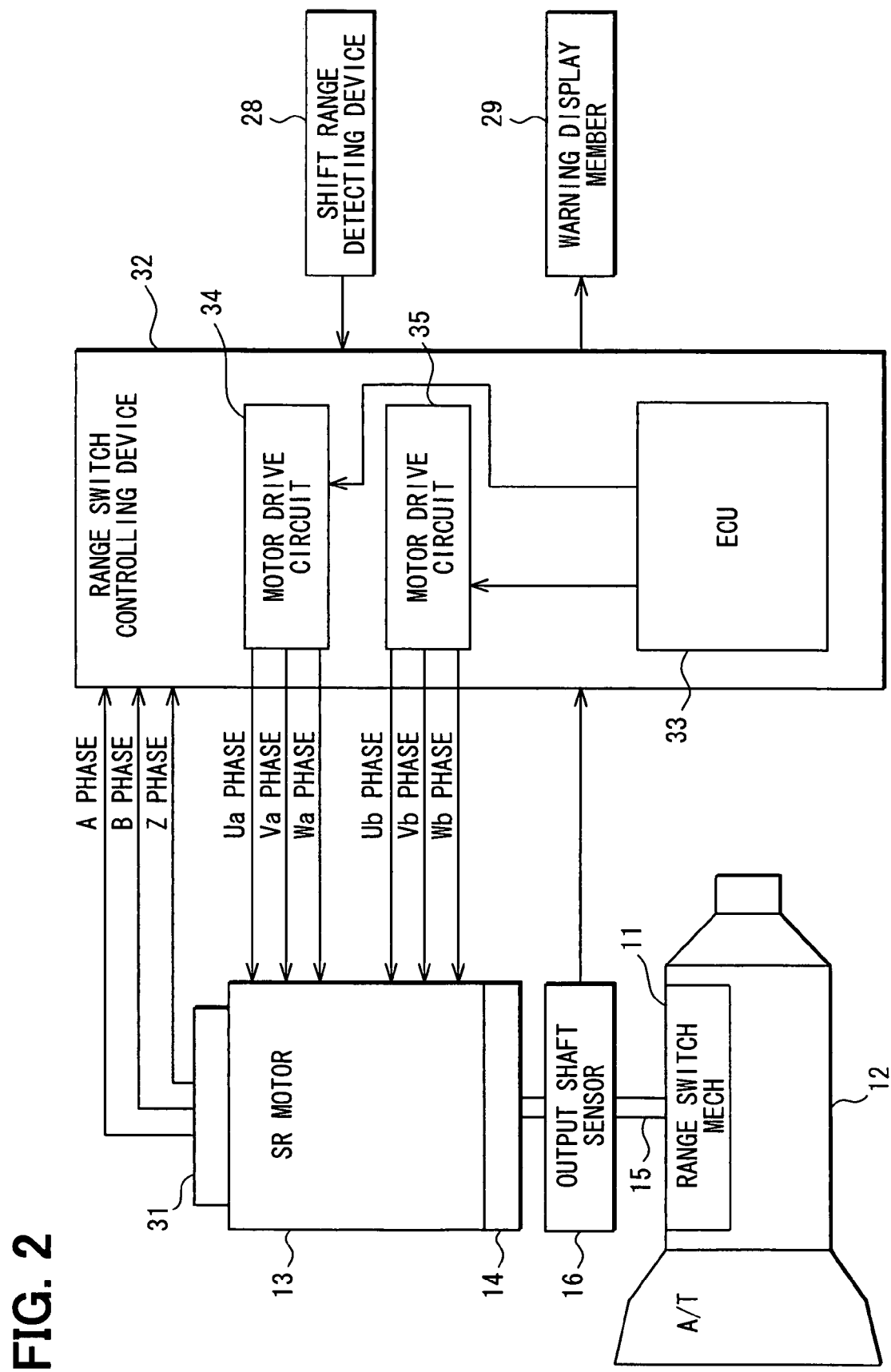
FIG. 2 is a schematic diagram of a general configuration of a control system of the range switch device.

Firstly, referring to FIGS. 1 and 2, a configuration of a range switch mechanism 11 is described. The range switch mechanism 11 changes (switches) a range of an automatic transmission 12 into, for example, a parking range (P), a reverse range (R), a neutral range (N), and a drive range (D). The range switch mechanism 11 has a motor 13 as a drive source, which includes, for example, a synchronous motor such as a switched reluctance motor (SR motor). The motor 13 internally includes a reduction mechanism 14 (see FIG. 2), and includes an output shaft sensor 16 for sensing a rotation angle of an output shaft 15 fitted and connected with a rotation shaft of the reduction mechanism 14. The output shaft sensor 16 includes a rotation angle sensor (e.g., potentiometer), which linearly changes an output voltage in accordance with the rotation angle of the output shaft 15 of the reduction mechanism 14 of the motor 13. Based on the output voltage, a current rotation angle of the output shaft 15 is detected, and further more, a current shift range is selectively known from P range, R range, N range, and D range.

The output shaft 15 of the motor 13 includes a detent lever 18 fixed thereto for switching a manual valve 17 for an oil-hydraulic circuit of the automatic transmission 12. The detent lever 18 is fixed with an L-shaped parking rod 19, and the parking rod 19 has a conic body 20 at an end portion of the rod 19 such that the conic body 20 contacts with a lock lever 21. The lock lever 21 moves upward and downward around a shaft 22 in accordance with a position of the conic body 20 to lock and unlock a parking gear 23. The parking gear 23 is provided to an output shaft of the automatic transmission 12, and when the parking gear 23 is locked by the lock lever 21, a driven wheel of the vehicle is kept restricted from rotating (kept at a parking state).

Also, the detent lever 18 is connected with a spool valve 24 of the manual valve 17, and the motor 13 rotates the detent lever 18 together with the output shaft 15 to change an operation amount of the manual valve 17 (e.g., to change a position of the spool valve 24) such that the range of the automatic transmission 12 is changed into any one of P range, R range, N range, and D range. The detent lever 18 is provided with four support recesses 25, which are adapted to hold the spool valve 24 at positions corresponding to the above shift ranges.

In contrast, the manual valve 17 is fixed with a detent spring 26, which supports the detent lever 18 at a position corresponding to each of the shift ranges. Therefore, when an engaging portion 27 provided at an end of the detent spring 26 is fitted with the support recess 25 of the detent lever 18, which corresponds to a required shift range, the detent lever 18 is held at a rotation angle of the required shift range. As a result, a location of the spool valve 24 of the manual valve 17 is held at a position corresponding to the required shift range.

For P range, the parking rod 19 is displaced toward the lock lever 21 such that a thick portion of the conic body 20 pushes the lock lever 21 upwardly. Therefore, a protrusion 21a of the lock lever 21 is fitted with the parking gear 23 such that the parking gear 23 is locked. As a result, the output shaft (driven wheel) of the automatic transmission 12 is kept locked (kept at the parking state).

In contrast, for the shift ranges other than P range, the parking rod 19 is displaced away from the lock lever 21 such that the thick portion of the conic body 20 is released from (detached from) the lock lever 21, and thereby the lock lever 21 descends (e.g., moves downwardly in FIG. 1). As a result, the protrusion 21a of the lock lever 21 is disengaged from the parking gear 23 such that the parking gear 23 is unlocked. Thus, the output shaft of the automatic transmission 12 is kept rotatable (kept at a drive state).

Figure 3:
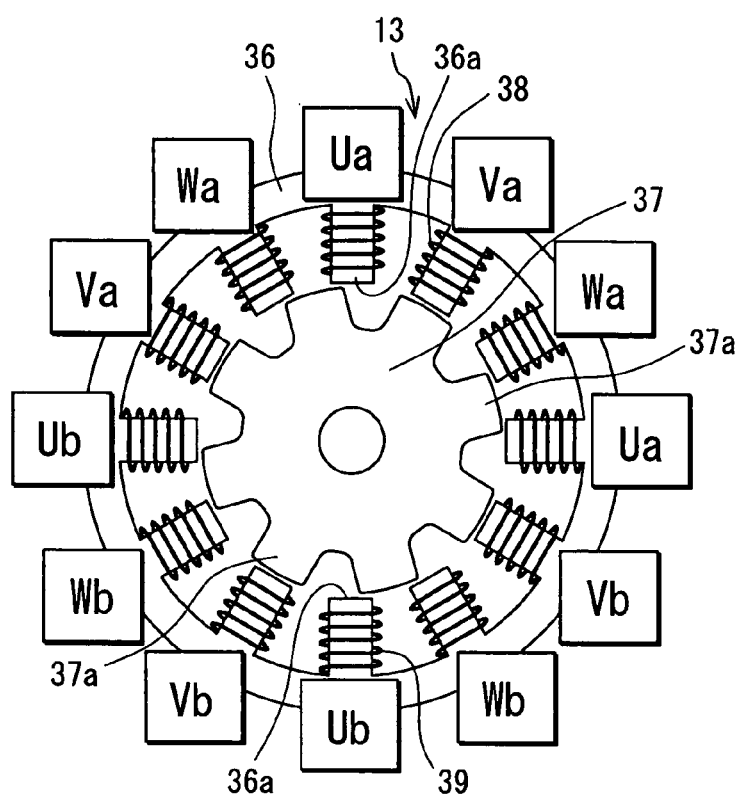
FIG. 3 is a view used for explaining a configuration of a motor.
Figure 4:
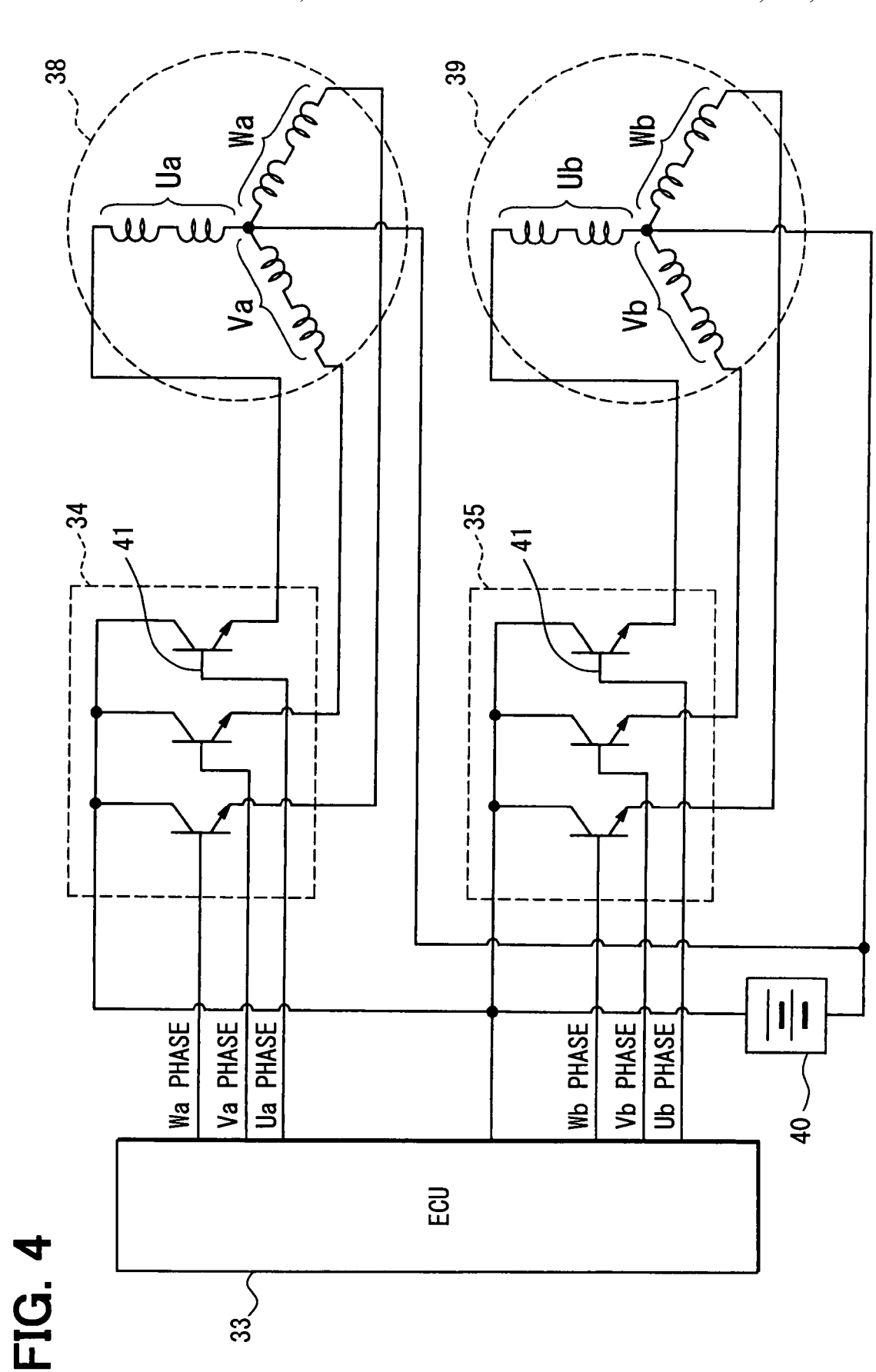
FIG. 4 is a view used for explaining a circuit configuration for driving the motor.

Next, referring to FIGS. 3 and 4, a configuration of the motor 13 is described. The motor 13 of the first embodiment is a switched reluctance motor, in which a stator core 36 and a rotor 37 both have salient pole structures. Thus, advantageously, the motor does not require a permanent magnet, and therefore has a simple structure.

The stator core 36 has a hollow cylindrical shape, and has an inner peripheral portion, on which, for example, twelve salient poles 36a are arranged with an equal interval. Correspondingly, the rotor 37 has an outer peripheral portion, on which, for example, eight salient poles 37a are arranged with an equal interval. Therefore, along with rotation of the rotor 37, each of the salient poles 37a of the rotor 37 faces by turns with each of the salient poles 36a of the stator core 36 with a very small gap therebetween. The twelve salient poles 36a of the stator core 36 are wound with windings, and one winding for one of the two lines (a line, b line) for U phase, V phase, and W phase of drive coils 38, 39, is wound at an opposite position opposite the other winding of the other of the lines. Here, the number of the salient poles 36a, 37a of the stator core 36 and the rotor 37 can be alternatively changed as required.

In the below description, "U phase", "V phase", and "W phase" of one (a line) of the lines of the drive coil 38 are indicated as "Ua phase", "Va phase", and "Wa phase", respectively. Also, "U phase", "V phase", and "W phase" of the other one (b line) of the lines of the drive coil 39 are indicated as "Ub phase", "Vb phase", and "Wb phase", respectively.

The winding of each phase of the drive coils 38, 39 of two lines is wound to each of the twelve salient poles 36a of the stator core 36 in this order, for example, Va phase→Wa phase→Ua phase→Va phase→Wa phase→Ua phase→Vb phase→Wb phase→Ub phase→Vb phase→Wb phase→Ub phase.

As shown in FIG. 4, the drive coils 38, 39 of two lines are driven by each of motor drive circuits 34, 35 using a battery 40 mounted on the vehicle as a power source. In this way, two lines of the drive coils 38, 39 and two lines of the motor drive circuits 34, 35 are provided such that even in a case, where one of the two lines malfunctions, the other one of the lines is adapted to drive the motor 13. A circuit configuration of the motor drive circuits 34, 35 shown in FIG. 4 indicates a circuit configuration of a unipolar drive type, in which a switching element 41, such as a transistor, is provided in each phase. Alternatively, bipolar drive circuit configuration may be applied, in which two switching elements are provided in each phase.

An ECU 33 controls ON/OFF of each of the motor drive circuits 34, 35 and each of the switching elements 41. As shown in FIG. 2, the ECU 33 and each of the motor drive circuits 34, 35 are provided to a range switch controlling device 32. The range switch controlling device 32 is connected with a shift range detecting device 28, which detects an operation position (required shift range) of a shift lever operated by an occupant (driver of the vehicle). The shift lever and the shift range detecting device 28 function as range switch operating means of the present embodiment of the invention.

Also, the motor 13 is provided with an encoder 31 for detecting a rotation angle of the rotor 37. The encoder 31 has, for example, a magnetic rotary encoder, and is adapted to synchronize with rotation of the rotor 37 of the motor 13 for outputting pulse signals of A phase, B phase, and Z phase to the range switch controlling device 32. The ECU 33 of the range switch controlling device 32 counts both rising/falling edges of A phase signal and B phase signal outputted by the encoder 31. Then, the ECU 33 changes energization phases of the motor 13 using the motor drive circuits 34, 35 to rotate and drive the motor 13 in a predetermined order (sequence) in accordance with the encoder count value (the counted number of edges of signals outputted from the encoder 31).

In this case, based on a generation sequence of A phase signal and B phase signal, a rotation direction of the rotor 37 is determined. For a normal rotation (a direction of P range→D range), the encoder count value is increased (e.g., counted upwardly). Also, for a reverse rotation (a direction of D range→P range), the encoder count value is decreased (e.g., counted downwardly). In this way, even when the motor 13 rotates in either direction (normal rotation/reverse rotation), a corresponding relation between the encoder count value and the rotation angle of the motor 13 can be maintained, and therefore, the rotation angle of the motor 13 can be detected based on the encoder count value in both cases of rotation directions (e.g., normal rotation/reverse rotation). Thus, the winding of the phase, which corresponds to the rotation angle, is energized to rotate and drive the motor 13. It is noted that Z phase signal from the encoder 31 is utilized for detecting a reference rotation angle of the rotor 37 of the motor 13.

When the occupant operates the shift lever of the automatic transmission 12, an operation position of the shift lever (required shift range) is detected by the shift range detecting device 28, and an output signal of the shift range detecting device 28 (a signal of the required shift range) is received by the ECU 33 of the range switch controlling device 32. Therefore, the ECU 33 sets a target rotation angle corresponding to the required shift range (e.g., sets a target value for the encoder count value), and starts energizing the motor 13. Then, the ECU 33 controls the motor 13 using a feedback control such that the motor 13 stops at a position, where the encoder count value is equal to target value. A normal feedback control is executed by a normal drive (two-lines energization), in which the drive coils 38, 39 of two lines (two drive coils 38, 39) are energized to rotate and drive the rotor 37.

In the first embodiment, the normal drive (two-lines energization 2) is executed by a 1-2 phase excitation method, in which one-phase energization and two-phase energization are alternately changed, although 1 phase excitation method, in which one-phase energization is exclusively applied, or 2 phase excitation method, in which two-phase energization is exclusively applied, may be utilized. In either excitation method, for the normal drive (two-lines energization 2), Ua phase and Ub phase are simultaneously energized to energize "U phase", and Va phase and Vb phase are simultaneously energized to energize "V phase". Also, Wa phase and Wb phase are simultaneously energized to energize "W phase".

Figure 5:
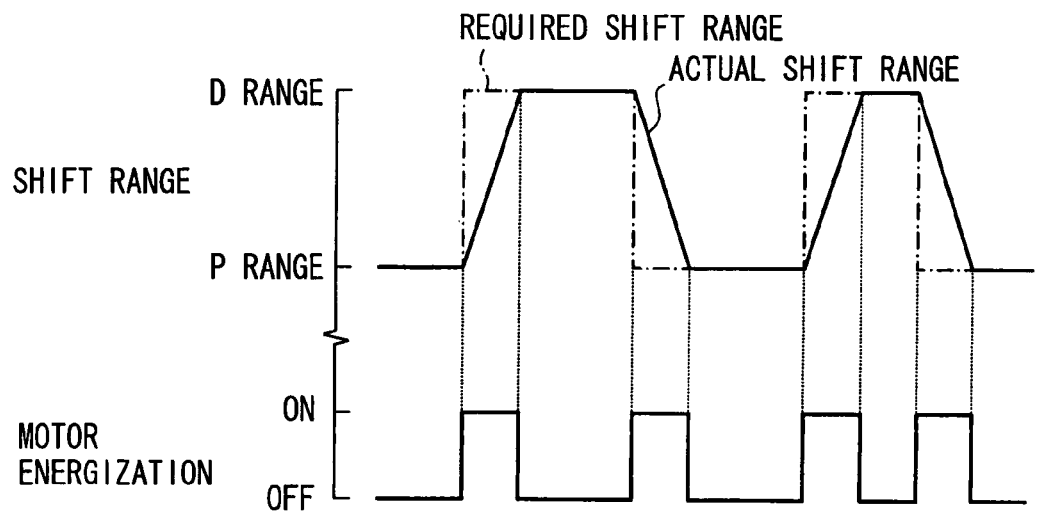
FIG. 5 is a time chart for explaining a relation between a range switch operation and an energization period for energizing the motor.

As shown in FIG. 5, every time the range switch operation is performed to change the required shift range, the motor 13 is started and then the motor 13 is stopped after the shift range of the range switch mechanism 11 has been changed into the required shift range by the feedback control, and the start and stop are repeated. While the motor 13 is energized, the drive coils 38, 39 of the motor 13 and the drive circuits 34, 35 generate heat. The motor stop period also serves as the motor cooling period, in which the heat generated by energizing the motor 13 is released to lower the temperature.

While the vehicle drives (travels), the occupant may not frequently change the shift range from D range to another range. However, the occupant may frequently repeat needless range switch operations for a pastime (for pleasure) while the vehicle stops because the shift range can be changed into any range while the vehicle stops. In a case, where the range switch operation is performed frequently, the motor stop period (motor cooling period) for each of the range switch operation may become shortened or become zero. As a result, the increase of the temperature due to the heat generation by the drive coils 38, 39 of the motor 13 and the drive circuits 34, 35 may not be controlled. Therefore, this may lead to excessive increase of the temperature of the drive coils 38, 39 of the motor 13 and of the drive circuits 34, 35. Thus, this may shorten the duration of life of the system and may cause malfunction of the system of the conventional art.

In contrast, for the countermeasure of the above disadvantages of the conventional art, in the first embodiment, the ECU 33 of the range switch controlling device 32 executes a range switch operation frequency monitoring routine (later shown with reference to FIG. 6) to monitor an operation frequency of the range switch operation. Also, in this routine, when the operation frequency of the range switch operation exceeds a predetermined frequency, it is determined that the increase of the temperature due to the heat generation by the motor 13 may exceed an allowable level if the range switch operation is repeated more frequently than this condition. Thus, until a predetermined motor cooling period elapses, a control of the motor 13 is changed into a heat generation limit control, in which the heat generation is less than that for a normal control at a normal state, and also a warning indication is shown in a warning display member 29 (warning means) to stop the needless range switch operation. Here, the warning display member 29 is mounted on an instrument panel of a driver's seat. Also, a warning sound may be alternatively generated. Alternatively, similar warning may be produced via a synthesized voice.

The present first embodiment considers the increase of the temperature of the drive coils 38, 39 of the motor 13 and of the drive circuits 34, 35 in a case, where the range switch operation is frequently repeated. Typically, the temperature of the drive coils 38, 39 of the motor 13 and of the drive circuits 34, 35 are increased proportionally to the number of times of the repetition of the range switch operation due to the accumulation of the heat generation of the drive coils 38, 39 and of the drive circuits 34, 35. Here, the number of times of the repetition of the range switch operation, which is consecutively repeated with a short operation interval, is counted such that the count value is utilized as detection information of the operation frequency of the range switch operation. Typically, the operation interval is equal to or less than a predetermined time (i.e., the operation interval, which is so short that the motor cooling period necessary for limiting the increase of the temperature is not attained). Therefore, the detection information of the operation frequency of the range switch operation serves as information, which corresponds to the increase of the temperature due to the heat generation of the drive coils 38, 39 of the motor 13 and the drive circuits 34, 35. As a result, when the range switch operation is frequently repeated, the control is changed into the heat generation limit control at appropriate timing in accordance with the increase of the temperature of the drive coils 38, 39 of the motor 13 and the drive circuits 34, 35.

Also, when the range switch operation is frequently repeated, this may be caused by the frequent repetition of the needless range switch operation by the occupant for the pastime while the vehicle stops. Thus, in the first embodiment, the heat generation limit control is performed such that the energization to the motor 13 is temporally inhibited (e.g., the heat generation limit control serves as a control for temporally inhibiting the change of the shift range). In this way, the increase of the temperature due to the heat generation by the drive coils 38, 39 of the motor 13 and the drive circuits 34, 35 can be more effectively limited (controlled). Because the range switch operation of this case is the needless range switch operation, the temporally inhibiting of the change of the shift range does not deteriorate the drive performance of the vehicle.

In the above described change of the motor control in accordance with the operation frequency of the range switch operation, the ECU 33 of the range switch controlling device 32 executes the range switch operation frequency monitoring routine shown in FIG. 6 as below.

Figure 6:
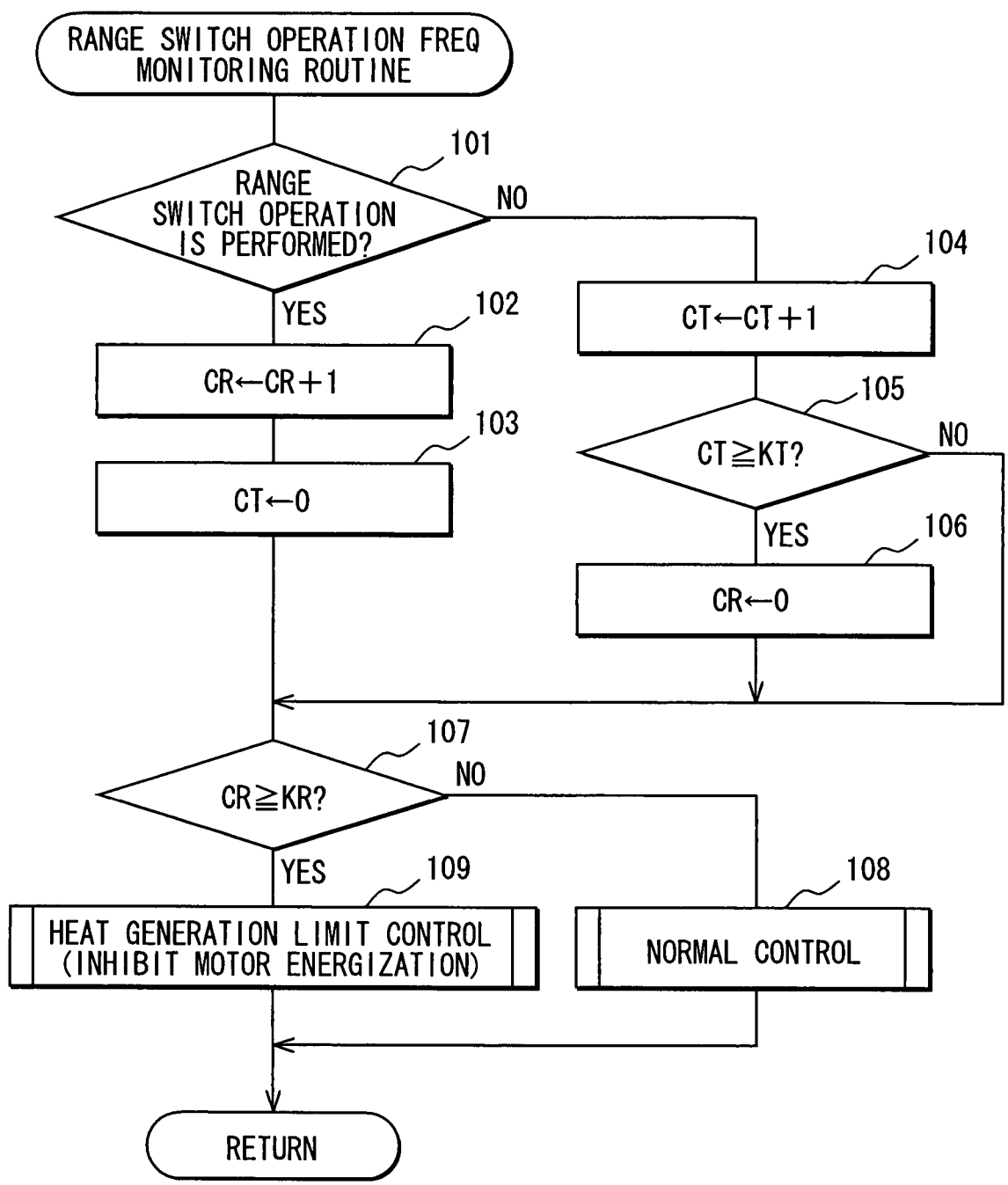
FIG. 6 is a flow chart showing a flow of a process of a range switch operation frequency monitoring routine of the first embodiment.

The range switch operation frequency monitoring routine shown in FIG. 6 is executed by a predetermined cycle while the ECU 33 is turned on. When the present routine of he present time is started, firstly, at step 101, it is determined whether the range switch operation has been performed since (after) the present routine of the previous time was executed. When the range switch operation has been performed, control continues with step 102 to increase by one a count value CR of an operation number counter (consecutive operation number counter), which counts an operation number of times of performing the range switch operation, and at step 103, a count value CT of an operation interval counter, which counts an elapsed time since a time of the range switch operation of the previous time, is reset to be zero.

In contrast, when it is determined at step 101 that the range switch operation has not been performed, control continues with step 104, where the count value CT counted by the operation interval counter is increased by one to count the elapsed time since the time of performing the range switch operation of the previous time. After this, at step 105, it is determined whether the count value CT of the operation interval counter (e.g., the elapsed time since the time of the range switch operation of the previous time) is equal to or larger than a predetermined value KT (e.g., a predetermined time KT). Here, the predetermined value KT is set as a value, which corresponds to a time necessary for cooling the motor 13 while the motor 13 is stopped by releasing the heat generation due to the energization of the motor 13 of the previous time. The predetermined value KT may be a predetermined constant value, although the predetermined value KT may be alternatively designed to be increased accordingly to the increase of the count value CR of the operation number counter under considerations of the increase of the temperature of the motor 13 due to the accumulation of the heat generated by the motor 13 when the number of repetition of the range switch operation increases.

When it is determined at step 105 that the count value CT of the operation interval counter (the elapsed time since the time of the range switch operation of the previous time) is equal to or larger than the predetermined value KT, it is determined that the heat generated due to the energization of the motor 13 of the previous time is substantially released during the stop of the motor 13. Thus, at step 106, the count value CR counted by the operation number counter is reset to be zero. In contrast to this, when it is determined at step 105 that the count value CT of the operation interval counter is less than the predetermined value KT, the count value CR of the operation number counter is not reset. In this way, when a non-operation time, in which the range switch operation is not performed, exceeds (e.g., is equal to or larger than) the predetermined time (KT), the count value CR counted by the operation number counter is reset to be zero.

By repeating the processes described at steps 101 to 106 by the predetermined cycle, the operation number counter counts the number of consecutive (continuous) operation of the range switch operation, which is consecutively performed with the short operation interval. Typically, the short operation interval is equal to or less than the predetermined time KT (i.e., the short operation interval is less than the motor cooling period necessary for limiting the increase of the temperature). The count value CR (the number of times of the consecutive operations) is utilized as the detection information of the operation frequency of the range switch operation. The above processes in steps 101 to 106 serve as operation frequency monitoring means of the present invention. In this way, with a very simple process using a consecutive operation number counter, the detection information of the operation frequency of the range switch operating means can serve as information, which is matched with the increase of the temperature due to heat generation of coils of the motor and of the drive circuit. As a result, when the range switch operation is frequently repeated, a control can be changed into the heat generation limit control at appropriate timing, which corresponds to the increase of the temperature of the coil of the motor and of the drive circuit.

After this, at step 107, it is determined whether the count value CR of the operation number counter (the number of times of the consecutive operation of the range switch operation with the short operation interval equal to or less than the predetermined time KT) is equal to or larger than a predetermined value KR. Typically, the predetermined value KR is set to correspond to an operation number of times, which indicates that the increase of the temperature due to the heat generation by the motor 13 may exceed an allowable level if the range switch operation is repeated more frequently than this operation number of times.

When it is determined at step 107 that the count value CR of the operation number counter is less than the predetermined value KR (i.e., the operation frequency of the range switch operation is less than a predetermined frequency), it is determined that the increase of the temperature due to the heat generation by the motor 13 has not exceeded the allowable level, and control continues with step 108 to perform a normal control. In the normal control, for example, the range switch operation is performed and every time the required shift range is changed, the motor 13 is started and is then stopped after the shift range of the range switch mechanism 11 has been changed into the required shift range by feedback control.

In contrast to this, when it is determined at step 107 that the count value CR of the operation number counter is equal to or larger than the predetermined value KR, it is determined that the increase of the temperature due to the heat generation by the motor 13 may exceed the allowable level in a case, where the range switch operation is repeated more frequently than this condition. Thus, at step 109, the control of the motor 13 is changed into the heat generation limit control (e.g., the control for temporally inhibiting the energization of the motor 13 in the first embodiment), where the heat generation is less than the normal control, and the warning indication is shown in the warning display member 29 to limit the needless range switch operation (alternatively, the synthesized voice may be generated for giving the similar warning). The processes in the above steps 107→109 serve as heat generation limit controlling means of the present invention.

It is noted that the following alternative process may be applied. After the control of the motor 13 has been changed into the heat generation limit control, it may be additionally determined whether a predetermined motor cooling period, which is necessary for appropriately lowering the temperature of the motor 13, has elapsed since the count value CR of the operation number counter exceeds the predetermined value KR (e.g., since the start of the heat generation limit control). When it is determined that the predetermined motor cooling period has elapsed, the heat generation limit control is finished. In other words, the heat generation limit control is executed for the predetermined motor cooling period since the time of that the count value CR of the operation number counter exceeds the predetermined value KR. Also, at the timing, where the predetermined the motor cooling period has elapsed, the counter value of the operation number counter is reset to be zero such that the control is returned to the normal control.

Figure 7:
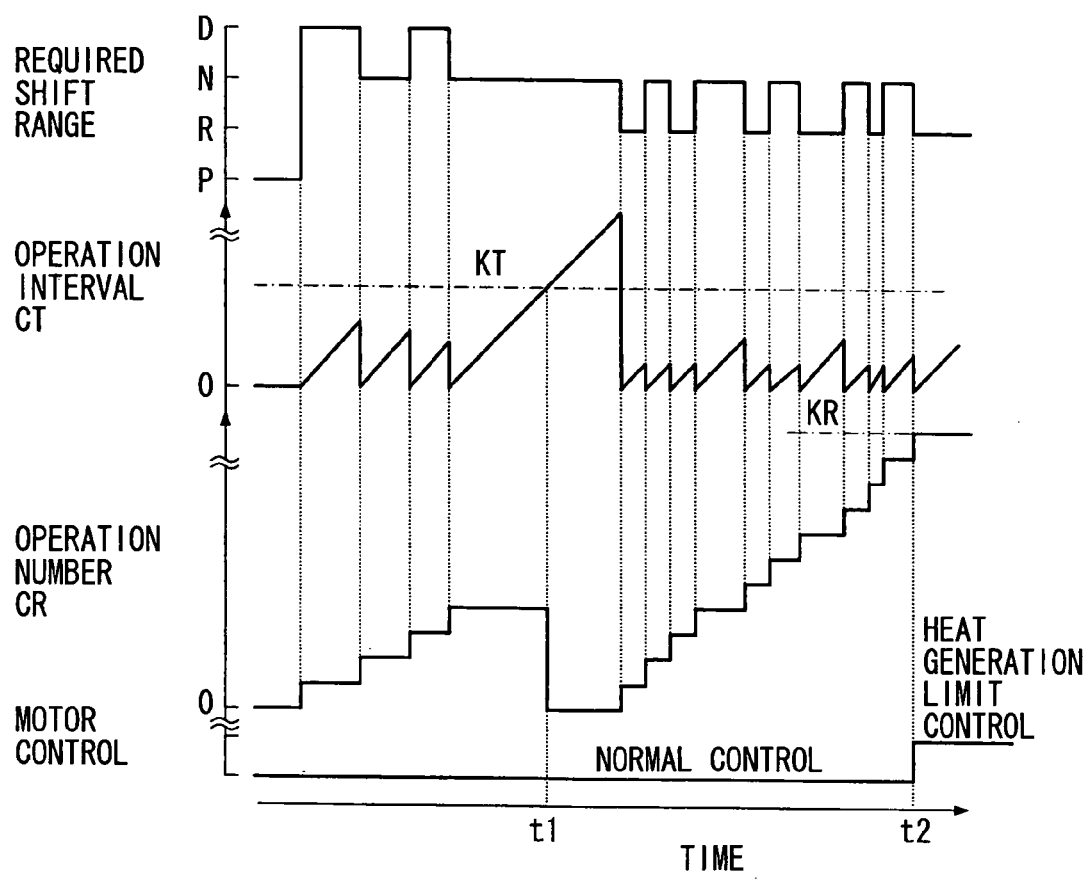
FIG. 7 is a time chart showing a control example of the first embodiment.

A control example of the above range switch operation frequency monitoring routine shown in FIG. 6 is described with reference to a time chart shown in FIG. 7. Every time the range switch operation is performed to change the required shift range, the operation interval counter is reset and restarted to count the operation interval of the range switch operation. Also, the count value CR of the operation number counter is increased by one to count the operation number of times of performing the range switch operation. In this case, when the count value CT of the operation interval counter is less than the predetermined value KT, the count value CR of the operation number counter is not reset. However, at timing t1, where the count value CT of the operation interval counter reaches the predetermined value KT, the count value CR of the operation number counter is reset to be zero. In this way, the operation number counter counts the number of the consecutive operation of the range switch operation, which is consecutively performed by the short operation interval. Typically, the operation interval is equal to or less than the predetermined time KT (i.e., the short operation interval is less than the motor cooling period necessary for limiting the increase of the temperature).

When the count value CR of the operation number counter is less than the predetermined value KR (i.e., the operation frequency of the range switch operation is less than a predetermined frequency), the normal control is performed. Also, at timing t2, where the count value CR of the operation number counter reaches the predetermined value KR, it is determined that the increase of the temperature due to the heat generation by the motor 13 may exceed the allowable level if the range switch operation is repeated more frequently than this condition. Thus, the control is changed from the normal control to the heat generation limit control (the control for temporally inhibiting the energization of the motor 13 in the first embodiment).

As a result, even if the occupant repeats the needless range switch operation for pastime (for pleasure), the increase of the temperature due to the heat generation by the motor 13 can be limited. Therefore, decrease of the duration of life of the system due to the excessive increase of the temperature is limited, and malfunction due to the excessive increase of the temperature is also limited.

Also, in the first embodiment, because the warning display member 29 is adapted to display the warning indication to inhibit the needless range switch operation (alternatively, the synthesized voice for the similar warning may be generated) while the heat generation limit control is executed, the occupant is limited from performing the needless range switch operation.

Note that, in the first embodiment, the heat generation limit control is a control for temporally inhibiting the energization of the motor 13 (a control for temporally inhibiting the change of the shift range), although in another example of the present invention, a heat generation limit control may be a control for the energization of the motor 13 with a less electric current than the normal control at the normal state. From here, second to sixth embodiments, which embody the above example of the present invention, are described. Each of the second to sixth embodiments is similar to the first embodiment unless clearly indicated otherwise.

Second Embodiment

Figure 8:
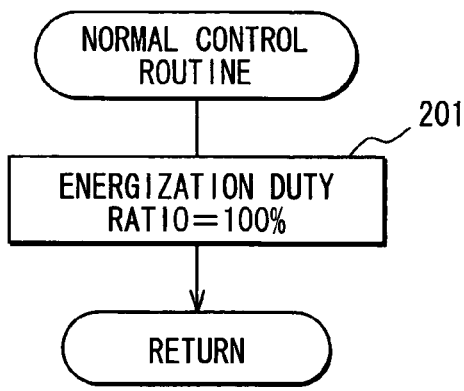
FIG. 8 is a flow chart showing a flow of process of a normal control routine of a second embodiment of the present invention.
Figure 9:
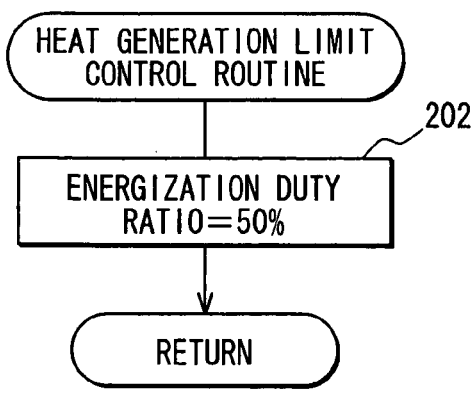
FIG. 9 is a flow chart showing a flow of a process of a heat generation limit control routine of the second embodiment of the present invention.

In the second embodiment of the present invention shown in FIG. 8 and FIG. 9, an energization current of the motor 13 (motor drive voltage) is controlled by a duty control. Also, in a method similar to the first embodiment, the number of times of the consecutive operation of the range switch operation, which is consecutively operated by the short operation interval, is counted by the operation number counter. Typically, the short operation interval is equal to or less than the predetermined time KT (e.g., the operation interval is so short that the motor cooling period necessary for limiting the increase of the temperature is not achieved). When the count value CR of the operation number counter is less than the predetermined value KR (i.e., the operation frequency of the range switch operation is less than a predetermined frequency), it is determined that the increase of the temperature due to the heat generation by the motor 13 has not exceeded the allowable level (allowable limit). Thus, a normal control routine shown in FIG. 8 is executed such that an energization duty ratio of the motor 13 is set as a normal duty ratio, for example, as 100% at step 201. Then, in accordance with the range switch operation, the motor 13 is driven at the duty ratio of 100% such that the shift range of the range switch mechanism 11 is changed into the required shift range by a feedback control.

Also, when the count value CR of the operation number counter becomes equal to or larger the predetermined value KR, it is determined that the increase of the temperature due to the heat generation by the motor 13 may exceed the allowable level if the range switch operation is repeated more frequently than this condition. Thus, a heat generation limit control routine of FIG. 9 is executed such that the energization duty ratio of the motor 13 is set as a lower duty ratio lower than usual, for example, as 50% at step 202. Thus, the motor 13 is driven at the duty ratio of 50%, which is lower than that of the normal control, in accordance with the range switch operation, such that the shift range of the range switch mechanism 11 is changed into the required shift range by the feedback control.

As described in the second embodiment, if the energization duty ratio of the motor 13 is lowered while the heat generation limit control is executed, the drive voltage of the motor 13 is reduced such that the energization current of the motor 13 can be reduced. As a result, the increase of the temperature due to the heat generation by the motor 13 can be limited.

It is noted that the energization duty ratio for the heat generation limit control is not limited to 50%, and that the energization duty ratio for the normal control is not limited to 100%. The energization duty ratios can be modified as required.

Third Embodiment

Figure 11:
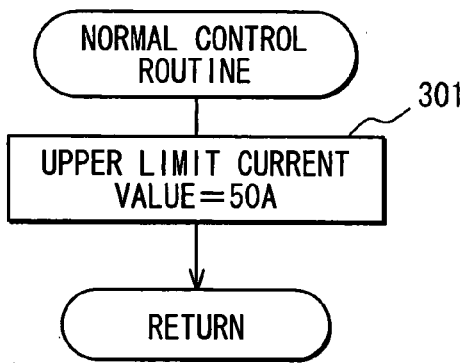
FIG. 11 is a flow chart showing a flow of a process of a normal control routine of the third embodiment.
Figure 12:
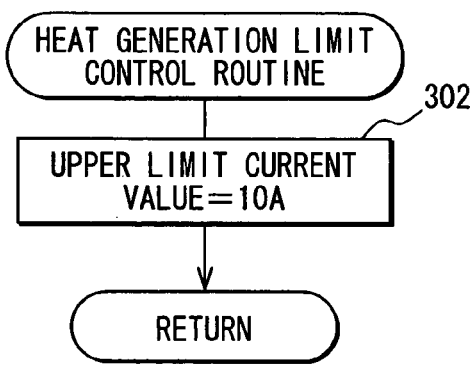
FIG. 12 is a flow chart showing a flow of a process of a heat generation limit control routine of the third embodiment.

In the third embodiment of the present invention shown in FIGS. 10 to 12, the motor drive circuits 34, 35 are provided with electric current limiting circuits 42, 43, which set the energization current of the motor 13 to be equal to or less than a preset upper limit electric current value. The preset upper limit electric current values of the electric current limiting circuits 42, 43 can be modified by the ECU 33 of the range switch controlling device 32.

In the method similar to the first embodiment, the operation number counter counts the number of times of the consecutive operation of the range switch operation, which is consecutively performed by the short operation interval equal to or less than the predetermined time KT. When the count value CR of the operation number counter is less than the predetermined value KR, it is determined that the increase of the temperature due to the heat generation by the motor 13 has not exceeded the allowable level. Thus, a normal control routine of FIG. 11 is executed such that the preset upper limit electric current values of the electric current limiting circuits 42, 43 are set as normal set values, for example, as 50A at step 301. As a result, the motor 13 is driven at the electric current of 50A in accordance with the range switch operation such that the shift range of the range switch mechanism 11 is changed into the required shift range by the feedback control.

When the count value CR of the operation number counter is equal to or larger than the predetermined value KR, it is determined that the increase of the temperature due to the heat generation by the motor 13 may exceed the allowable level if the range switch operation is repeated more frequently than this condition. Thus, a heat generation limit control routine of FIG. 12 is executed such that the preset upper limit electric current values of the electric current limiting circuits 42, 43 are set as lower electric current values lower than that for the normal control, for example, as 10A at step 302. As a result, the motor 13 is driven at the lower electric current of 10A in accordance with the range switch operation such that the shift range of the range switch mechanism 11 is changed into the required shift range by the feedback control.

As in the third embodiment, when the preset upper limit electric current values of the electric current limiting circuits 42, 43 are lowered while the heat generation limit control is executed, the energization current of the motor 13 can be lowered such that the increase of the temperature due to the heat generation by the motor 13 can be limited.

It is noted that the preset upper limit electric current values of the electric current limiting circuits 42, 43 during the heat generation limit control are not limited to 10A, and that the preset upper limit electric current values of the electric current limiting circuits 42, 43 during the normal control are not limited to 50A. The preset upper limit electric current values may be modified as required.

Fourth Embodiment

Figure 13:
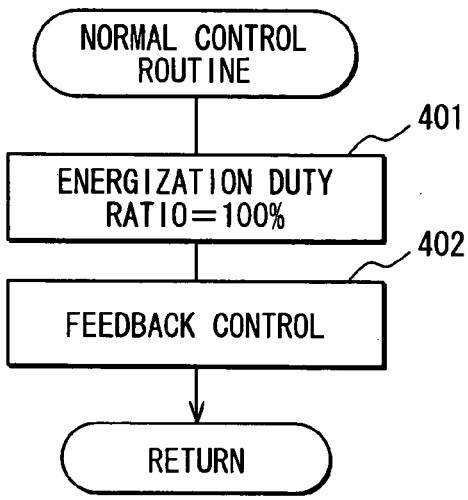
FIG. 13 is a flow chart showing a flow of a process of a normal control routine of a fourth embodiment of the present invention.
Figure 14:
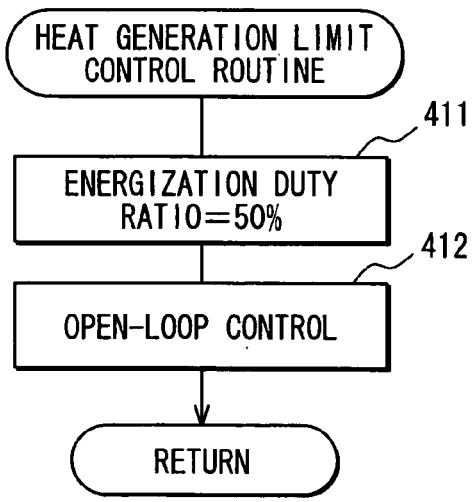
FIG. 14 is a flow chart showing a flow of a process of a heat generation limit control routine of the fourth embodiment.

In the fourth embodiment of the present invention shown in FIGS. 13 and 14, a motor drive method (motor control mode) is changed between one for the normal control and the other for the heat generation limit control. As a result, while the heat generation limit control is executed, the energization current of the motor 13 can be lowered.

Specifically, in the fourth embodiment, in the method similar to the first embodiment, the operation number counter counts the number of times of the consecutive operation of the range switch operation, which is consecutively performed by the short operation interval equal to or less than the predetermined time KT. When the count value CR of the operation number counter is less than the predetermined value KR, it is determined that the increase of the temperature due to the heat generation by the motor 13 has not exceeded the allowable level. Thus, a normal control routine of FIG. 13 is executed such that the energization duty ratio of the motor 13 is set as a normal duty ratio, for example, as 100% at step 401, and the motor drive method is set as the feedback control at step 402. Thus, the motor 13 is driven at the duty ratio, of 100% by the feedback control in accordance with the range switch operation such that the shift range of the range switch mechanism 11 is changed into the required shift range.

When the count value CR of the operation number counter becomes equal to or larger than the predetermined value KR, it is determined that the increase of the temperature due to the heat generation by the motor 13 may exceed the allowable level if the range switch operation is repeated more frequently than this condition. Thus, a heat generation limit control routine of FIG. 14 is executed such that the energization duty ratio of the motor 13 is set at a lower duty ratio lower than that for the normal control, for example, as 50% at step 411, and the motor drive method is changed into an open-loop control at step 412. As a result, the motor 13 is driven at the duty ratio of 50 by the open-loop control in accordance with the range switch operation such that the shift range of the range switch mechanism 11 is changed into the required shift range. In the open-loop control, the energization phases of the motor 13 are changed by turns by a predetermined time interval, and the number of times of changing the energization phases is counted. Thus, based on the count value (e.g., the number of times of changing the energization phases) the motor 13 is rotated and driven to a target position in accordance with the required shift range.

As the fourth embodiment, when the motor drive method is changed into the open-loop control while the heat generation limit control is executed, the rotation speed of the motor 13 can be reliably decreased such that the energization current of the motor 13 can be substantially lowered by the duty control. Therefore, the increase of the temperature due to the heat generation by the motor 13 can be limited.

It is noted that a motor excitation method for the open-loop control (an order for changing the energization phases) may be the same as a motor excitation method for the feedback control, and may be modified. The motor excitation method may be any one of 1-2 phase excitation method, 1 phase excitation method, and 2 phase excitation method.

Fifth Embodiment

Figure 15:
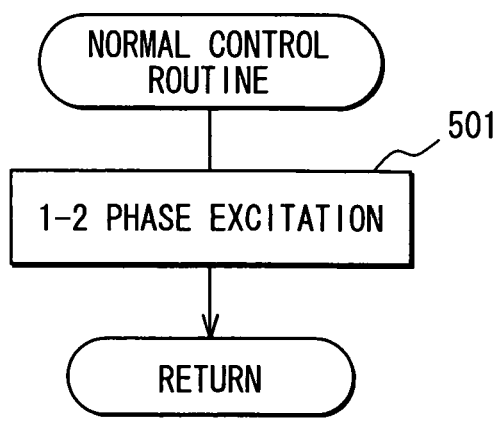
FIG. 15 is a flow chart showing a flow of a process of a normal control routine of a fifth embodiment of the present invention.
Figure 16:
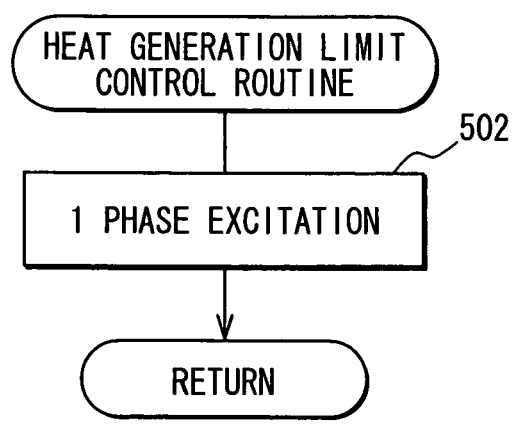
FIG. 16 is a flow chart showing a flow of a process a heat generation limit control routine the fifth embodiment.

In the fifth embodiment of the present invention shown in FIG. 15 and FIG. 16, a motor excitation method is changed between one for the normal control and the other for the heat generation limit control such that the energization current of the motor 13 can be lowered during the heat generation limit control.

Specifically, in the fifth embodiment, in a method similar to the first embodiment, the operation number counter counts the number of times of the consecutive operation of the range switch operation, which is consecutively performed by the short operation interval equal to or less than the predetermined time KT. When the count value CR of the operation number counter is less than the predetermined value KR, it is determined that the increase of the temperature due to the heat generation by the motor 13 has not exceeded the allowable level. Thus, a normal control routine of FIG. 15 is executed such that a motor excitation method is set as a 1-2 phase excitation method, in which one-phase energization and two-phase energization are alternately changed (switched), at step 501. As a result, the motor 13 is driven through the 1-2 phase excitation method by the feedback control in accordance with the range switch operation such that the shift range of the range switch mechanism 11 is changed into the required shift range.

When the count value CR of the operation number counter becomes equal to or larger than the predetermined value KR, it is determined that the increase of the temperature due to the heat generation by the motor 13 may exceed the allowable level if the range switch operation is repeated more frequently than this condition. Thus, a heat generation limit control routine of FIG. 16 is executed such that the motor excitation method is set as 1 phase excitation method, in which the motor 13 is driven only by one-phase energization at step 502. As a result, the motor 13 is driven through the 1 phase excitation method by the feedback control in accordance with the range switch operation such that the shift range of the range switch mechanism 11 is changed into the required shift range.

When the motor excitation method is changed from the 1-2 phase excitation method to the 1 phase excitation method while the heat generation limit control is executed as described in the fifth embodiment, the energization current of the motor 13 can be lowered, and therefore, the increase of the temperature due to the heat generation by the motor 13 can be limited.

It is noted that in a case, where the motor 13 is driven by the 2 phase excitation method during the normal control instead of the 1-2 phase excitation method as described in the fifth embodiment, the motor excitation method may be changed from the 2 phase excitation method to one of the 1-2 phase excitation method and the 1 phase excitation method during the heat generation limit control, alternatively.

In the above first to fifth embodiments, as shown in FIGS. 2 to 4, 10, a system is provided with the two drive coils 38, 39 (two lines of the drive coils 38, 39) of the motor 13 and the two motor drive circuits 34, 35 (corresponding two lines of the motor drive circuits 34, 35) as a fail-safe structure. The present invention is not limited to this. The present invention may be alternatively applicable to a motor drive system, which is provided with only one line of the above structure.

Sixth Embodiment

Figure 17:
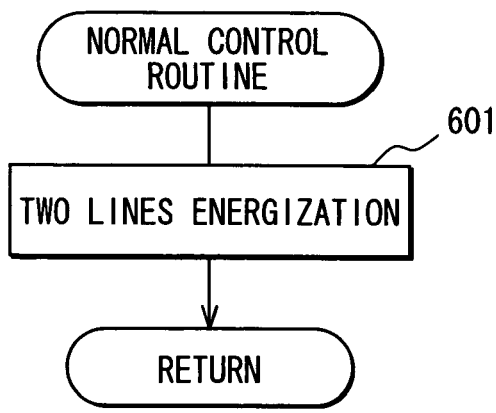
FIG. 17 is a flow chart showing a flow of a process of a normal control routine of a sixth embodiment of the present invention.
Figure 18:
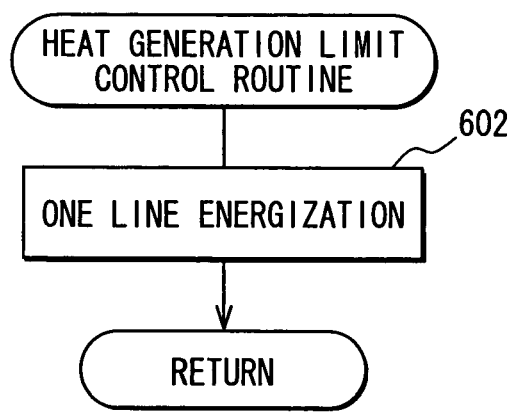
FIG. 18 is a flow chart showing a flow of a process of a heat generation limit control routine of the sixth embodiment.

The sixth embodiment of the present invention shown in FIGS. 17, 18, is an embodiment, which is applied to a system provided with the two drive coils 38, 39 of the motor 13 and of the two motor drive circuits 34, 35 as shown in FIGS. 2 to 4, 10 for the fail safe purpose.

In the sixth embodiment, in the similar method similar to the first embodiment, the operation number counter counts the number of times of the consecutive operation of performing the range switch operation, which is consecutively performed with the short operation interval equal to or less than the predetermined time KT. When the count value CR of the operation number counter is less than the predetermined value KR, it is determined that the increase of the temperature due to the heat generation by the motor 13 has not exceeded the allowable level. Thus, a normal control routine of FIG. 17 is executed such that "two lines energization", in which the two drive coils 38, 39 of the motor 13 and of the two motor drive circuits 34, 35 are both energized, is set at step 601. As a result, the motor 13 is driven through the two lines energization by the feedback control in accordance with the range switch operation such that the shift range of the range switch mechanism 11 is changed into the required shift range.

When the count value CR of the operation number counter is equal to or larger than the predetermined value KR, it is determined that the increase of the temperature due to the heat generation by the motor 13 may exceed the allowable level if the range switch operation is repeated more frequently than this condition. Thus, a heat generation limit control routine of FIG. 18 is executed such that a control is changed into "one line energization" at step 602, in which only one of the two drive coils 38, 39 of the motor 13 and of a corresponding one of the two motor drive circuits 34, 35 are energized. As a result, the motor 13 is driven through the one line energization by the feedback control in accordance with the range switch operation such that the shift range of the range switch mechanism 11 is changed into the required shift range.

As in the sixth embodiment, when the control is changed from the two lines energization to the one line energization during the heat generation limit control, the energization current of the motor 13 can be reduced, and the increase of the temperature due to the heat generation by the motor 13 can be limited.

Seventh Embodiment

A rotation angle (operation angle) of the motor 13 differs between one case, where P range is switched to D range, and another case, where N range is switched to D range. As a result, the heat generation rates (heat generation amounts) generated from the drive coils 38, 39 of the motor 13 and from the drive circuits 34, 35 are different between the two cases. When the range is switched from N range to D range (when N range is switched to D range), the rotation angle of the motor 13 is smaller than the case, where P range is switched to D range, and thereby the heat generation rate is smaller. Thus, in a case, where the switching operation from N range to D range is reflected to the operation frequency (the count value CR of the operation number counter) equivalently to the switching operation from P range to D range as the first embodiment (FIG. 6), the heat generation rate for the switching operation form N range to D range may be overestimated. Thus, when the switching operation from P range to D range is repeated, control may be changed into the heat generation limit control, although the heat generation at this moment may still be allowable.

For the countermeasure for the above disadvantage, in the present embodiment, the operation number of times of performing the range switch operation and the rotation angle of the motor 13 for each operation are both considered to determine the operation frequency. The seventh embodiment of the present invention embodies the above, and is described with reference to FIG. 19.

Figure 19:
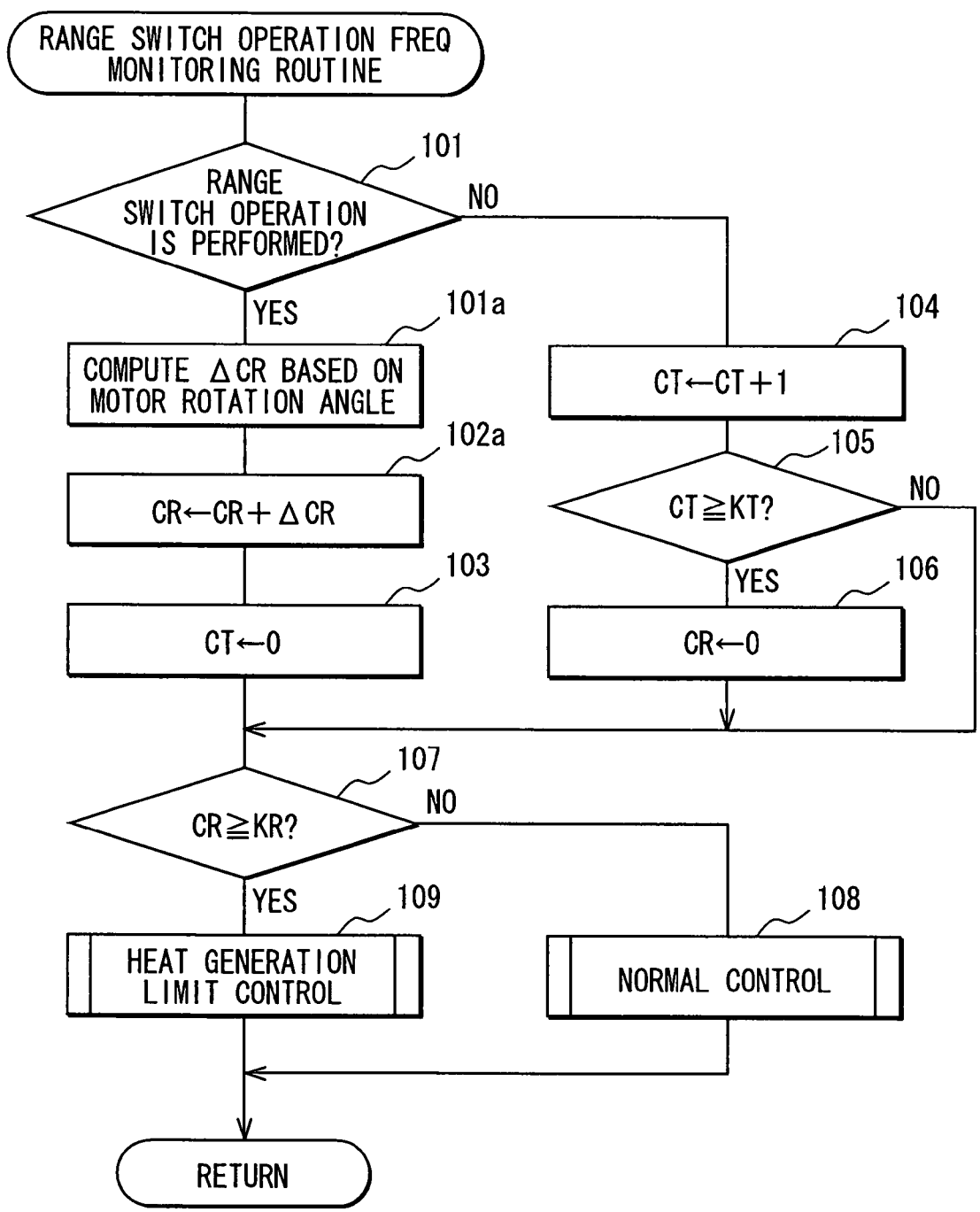
FIG. 19 is a flow chart showing a flow of a process of a range switch operation frequency monitoring routine of a seventh embodiment of the present invention.

A range switch operation frequency monitoring routine of FIG. 19 executed in the seventh embodiment is a modification of the range switch operation frequency monitoring routine of FIG. 6 described in the first embodiment. Specifically, a process at step 102 in the first embodiment is modified into processes at steps 101a, 102a in the present embodiment, and processes at other steps remain the same.

When the present routine is started, firstly, it is determined at step 101 whether the range switch operation has been performed after the present routine of the previous time was executed. When the range switch operation has been performed, a count-up value, CR is computed at step 101 a using a map and the like in accordance with the rotation angle (heat generation rate) of the motor 13 of the range switch operation of the present time. For example, in the switching operation from P range to D range (P to D switching operation), the count-up value, CR is set as "1", and in the switching operation from N range to D range (N to D switching operation), the count-up value, CR is set as "0.3" under consideration of that the heat generation rate of the N to D switching operation is about 30% of that of the P to D switching operation.

Then, at step 102*a*, the count value CR of the operation number counter (consecutive operation number counter) is increased by the count-up value, CR, which is computed based on the rotation angle of the motor 13. Then, a similar process is executed similar to the range switch operation frequency monitoring routine of FIG. 6 described in the first embodiment. It is noted that a heat generation limit control of step 109 is executed by any one of a method described in the first to sixth embodiments.

In the above seventh embodiment, the count value CR of the operation number counter is increased (i.e., the operation number counter is counted-up) by the count-up value, CR in accordance with the rotation angle (heat generation rate) of the motor 13 for each of the range switch operation. Thus, the count-up value, CR for each the range switch operation can be matched with the heat generation rate (the rotation angle of the motor 13) for each of the range switch operation. As a result, the count value CR of the operation number counter (detection information of the operation frequency of the range switch operation) can serve as information, which accurately corresponds to an actual heat generation rate by the motor 13. Thus, even when the switching operation from P range to D range is repeated, the control is limited from being changed into the heat generation limit control at timing, where the heat generation is still allowable.

It is noted that, in each of the above first to seventh embodiments a range switch device is adapted to change a range into each range of P, R, N, and D. However, in addition to it, for example, second range (2) and low range (L) may be added, and also, the present invention may be applied to a range switch device, which changes the range only between P range and a traveling range (other range other than P range).

Also, range switch operating means in each of the above first to seventh embodiments includes the shift lever and the shift range detecting device 28. However, alternative range switch operating means includes other operation component other than the shift lever for inputting a required shift range required by an occupant.

Also, as for the operation frequency of the range switch operation, alternatively, the operation number of times of the range switch operation per a predetermined time may be counted. This count value may serve as detection information of the operation frequency of the range switch operation.

Further, the present invention can be modified in various manners, and for example, a structure of the range switch mechanism 11 may be modified as required.

Additional advantages and modifications will readily occur to those skilled in the art. The invention in its broader terms is therefore not limited to the specific details, representative apparatus, and illustrative examples shown and described.

What is claimed is:

1. A controlling device comprising:
   a range switch mechanism that is adapted to change a shift range using a motor as a drive source;
   range switch operating means, through which an occupant inputs a required shift range required by the occupant, the motor being controlled in accordance with the required shift range inputted through the range switch operating means such that the shift range of the range switch mechanism is changed into the required shift range;
   operation frequency monitoring means for monitoring an operation frequency of the range switch operating means; and
   heat generation limit controlling means for switching a control of the motor to a heat generation limit control, in which a heat generation rate is less than that of a normal control, when the operation frequency of the range switch operating means exceeds a predetermined frequency.

2. The controlling device for the range switch mechanism according to claim 1, further comprising warning means for warning the occupant while the heat generation limit control is executed.

3. The controlling device for the range switch mechanism according to claim 1, wherein the operation frequency monitoring means includes the consecutive operation number counter, which increases a count value when a range switch operation is performed, the counter value of the consecutive operation number counter being reset when a non-operation time exceeds a predetermined time, the count value of the consecutive operation number counter serving as detected information of the operation frequency of the range switch operating means.

4. The controlling device for the range switch mechanism according to claim 1, wherein the operation frequency monitoring means determines the operation frequency based on an operation number of times of performing the range switch operation and on a rotation angle of the motor for each of the range switch operation.

5. The controlling device for the range switch mechanism according to claim 4, wherein the operation frequency monitoring means includes a consecutive operation number counter that is adapted to increase a count value by a count-up value, which is based on the rotation angle of the motor for each of the range switch operation, the count value of the consecutive operation number counter being reset when a non-operation time exceeds a predetermined time, the count value of the consecutive operation number counter being set as detection information of the operation frequency of the range switch operating means.

6. The controlling device for the range switch mechanism according to claim 1, wherein the heat generation limit controlling means temporally inhibits energization of the motor as the heat generation limit control.

7. The controlling device for the range switch mechanism according to claim 1, wherein the heat generation limit controlling means energizes the motor with an energization current less than that of the normal control as the heat generation limit control.

8. The controlling device for the range switch mechanism according to claim 1, wherein the heat generation limit controlling means performs the heat generation limit control for a predetermined motor cooling period since the operation frequency of the range switch operating means exceeds the predetermined frequency.

9. A controlling device for controlling a motor to perform a range switch operation for switching a shift range of a range switch mechanism of a vehicle, the controlling device comprising:
   an operation frequency detector that is adapted to detect an operation frequency of performing the range switch operation; and a heat generation limit controller that is adapted to switch a control of the motor into a heat generation limit control, in which a heat generation rate is less than a predetermined value, when the operation frequency of the range switch operation exceeds a predetermined frequency.

10. The controlling device according to claim 9, further comprising a warning member that is adapted to warn an occupant of the vehicle while the heat generation limit control is executed.

11. The controlling device according to claim 9, wherein the operation frequency detector includes a consecutive operation number counter, which increases a count value when the range switch operation is performed, the counter value of the consecutive operation number counter being reset when a non-operation time exceeds a predetermined time, the count value of the consecutive operation number counter serving as the operation frequency of the range switch operating means.

12. The controlling device according to claim 9, wherein the operation frequency detector determines the operation frequency based on an operation number of times of performing the range switch operation and on a rotation angle of the motor for each of the range switch operation.

13. The controlling device according to claim 11, wherein the consecutive operation number counter increases the count value by a count-up value, which is based on the rotation angle of the motor for each of the range switch operation.

14. The controlling device according to claim 9, wherein the heat generation limit controller temporally inhibits energization of the motor as the heat generation limit control.

15. The controlling device according to claim 9, wherein the heat generation limit controller energizes the motor with an energization current less than that of the normal control as the heat generation limit control.

16. The controlling device according to claim 9, wherein the heat generation limit controller determines whether a predetermined motor cooling period has elapsed since a time of start of the heat generation limit control by the heat generation limit controller, the heat generation limit controller finishing the heat generation limit control when determining that the predetermined motor cooling period has elapsed.

* * * * *